(12) United States Patent
Liu

(10) Patent No.: US 7,477,666 B2
(45) Date of Patent: Jan. 13, 2009

(54) ALL FIBER BASED SHORT PULSE AMPLIFICATION AT ONE MICRON

(75) Inventor: Jian Liu, Sunnyvale, CA (US)

(73) Assignee: Polar Onyx, Inc., Sunnyvale, CA (US)

( * ) Notice: Subject to any disclaimer, the term of this patent is extended or adjusted under 35 U.S.C. 154(b) by 122 days.

(21) Appl. No.: 11/386,240

(22) Filed: Mar. 21, 2006

(65) Prior Publication Data

US 2006/0227816 A1 Oct. 12, 2006

Related U.S. Application Data

(63) Continuation-in-part of application No. 11/136,040, filed on May 23, 2005.

(60) Provisional application No. 60/669,187, filed on Apr. 6, 2005.

(51) Int. Cl.
*H01S 3/30* (2006.01)
*H01S 3/10* (2006.01)

(52) U.S. Cl. .................. 372/6; 372/22; 372/27

(58) Field of Classification Search ............ 372/6, 372/22, 21
See application file for complete search history.

(56) References Cited

U.S. PATENT DOCUMENTS

| 5,736,709 | A | * | 4/1998 | Neiheisel | ............... | 219/121.61 |
|---|---|---|---|---|---|---|
| 6,081,543 | A | * | 6/2000 | Liu et al. | ............... | 372/102 |
| 6,608,951 | B1 | * | 8/2003 | Goldberg et al. | ............... | 385/43 |
| 6,778,565 | B2 | * | 8/2004 | Spuehler et al. | ............... | 372/25 |
| 2001/0038651 | A1 | * | 11/2001 | Maleki et al. | ............... | 372/6 |
| 2003/0156605 | A1 | * | 8/2003 | Richardson et al. | ............... | 372/25 |
| 2004/0061863 | A1 | * | 4/2004 | Digonnet | ............... | 356/460 |

* cited by examiner

*Primary Examiner*—Minsun Harvey
*Assistant Examiner*—Patrick Stafford
(74) *Attorney, Agent, or Firm*—Xin Wen

(57) ABSTRACT

A fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening/compression in the fiber laser cavity for generating an output laser with a transform-limited pulse shape wherein the wherein said laser gain medium further comprising a double cladding Ytterbium-doped Photonics crystal fiber (DC YDPCF) for amplifying and compacting a laser pulse. The fiber laser cavity further includes a polarization sensitive isolator and a polarization controller for further shaping the output laser.

29 Claims, 6 Drawing Sheets

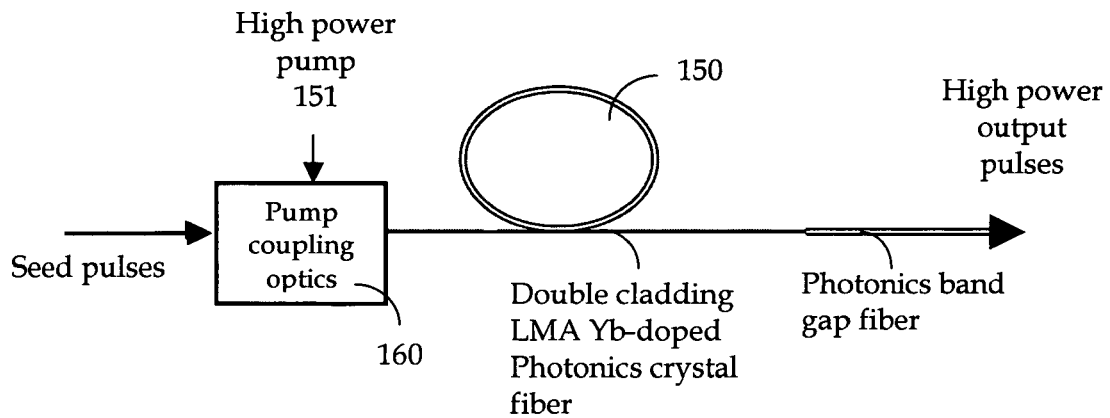
Fig. 3
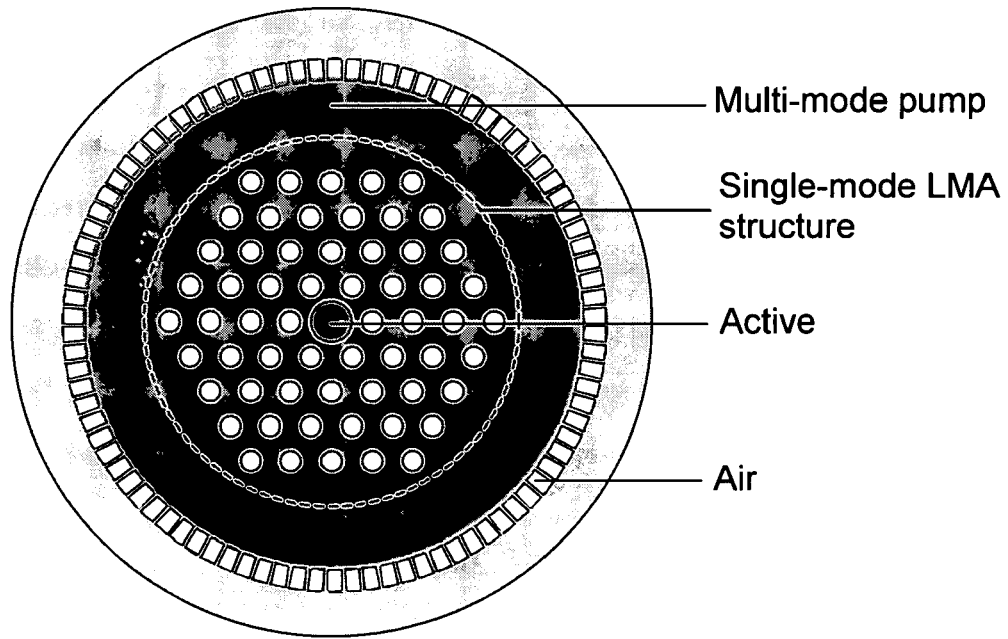
Figure 3A An example of double cladding LMA Yb doped Photonics crystal fiber (Crystal Fibre, Denmark)

Figure 3B An example for air core Photonics band gap fiber (Crystal fiber, Denmark)

ALL FIBER BASED SHORT PULSE AMPLIFICATION AT ONE MICRON

This Formal Application claims a Priority Date of Apr. 6, 2005 benefit from a Provisional Patent Application 60/669,187 filed by the same Applicant of this Application. Furthermore, this Formal application is a Continuation in Part (CIP) Application of another patent application Ser. No. 11/136,040 filed on May 23, 2005 by the same Applicant of this Application. The disclosures made in 60/669,187 and Ser. No. 11/136,040 are hereby incorporated by reference in this patent application.

FIELD OF THE INVENTION

The present invention relates generally to apparatuses and methods for providing short-pulsed mode-locked fiber laser. More particularly, this invention relates to new configurations and methods for providing a nonlinear polarization pulse-shaping mode-locked fiber laser with improved and better controllable pulse shapes.

BACKGROUND OF THE INVENTION

Conventional technologies of generating short pulse mode-locked fiber laser are still confronted with technical difficulties and limitations that the amplify the short pulse, e.g., a ps to 100 fs pulse, to a high energy level, e.g., up to mJ level. Furthermore, practical applications of the ultra-short pulse and high power laser cannot be easily achieved. Specifically, the practical usefulness of the ultra-short high power lasers are often hindered by the pulse shapes distortions. Furthermore, such laser systems are often bulky, difficult for maintaining optical alignment, and also lack sufficient robustness. All these difficulties prevent practical applications of the ultra-short high power lasers.

Historically, generation of mode-locked laser with the pulse width down to a femtosecond level is a difficult task due to limited resources of saturation absorbers and anomalous dispersions of fibers. Conventionally, short pulse mode locked fiber lasers operated at wavelengths below 1.3 µm present a particular challenge is that there is no simple all fiber based solution for dispersion compensation in this wavelength regime. (For wavelengths above 1.3 µm, several types of fibers exist exhibiting either normal or anomalous dispersion, so by splicing different lengths of fibers together one can obtain a cavity with an adjustable dispersion.) Therefore, previous researchers use bulk devices, such as grating pairs and prisms to provide an adjustable amount of dispersion for the cavity. Unfortunately these devices require the coupling of the fiber into a bulk device, which results in a laser that is highly sensitive to alignment and thus the environment Several conventional techniques disclosed different semiconductor saturation absorbers to configure the ultra-short high power laser systems. However, such configurations often developed into bulky and less robust systems due to the implementations of free space optics. Such systems have been disclosed by S. N. Bagayev, S. V. Chepurov, V. M. Klementyev, S. A. Kuznetsov, V. S. Pivtsov, V. V. Pokasov, V. F. Zakharyash, *A femtosecond self-mode-locked Ti:sapphire laser with high stability of pulserepetition frequency and its applications* (Appl. Phys. B, 70, 375-378 (2000).), and Jones D. J., Diddams S. A., Ranka J. K., Stentz A., Windeler R. S., Hall J. L., Cundi® S. T., *Carrierenvelope phase control of femtosecond mode-locked laser and direct optical frequency synthesis*. (Science, vol. 288, pp. 635-639, 2000.). 70, 375-378 (2000).).

Subsequently, the stretched mode-locked fiber lasers are disclosed to further improve the generation of the short pulse high power lasers. However, even in the stretched mode locked fiber lasers, the free space optic components such as quarter wave retarder and splitters for collimating and coupling are implemented. Examples of these systems are described by John L. Hall, Jun Ye, Scott A. Diddams, Long-Sheng Ma, Steven T. Cundi®, and David J. Jones, in "*Ultrasensitive Spectroscopy, the Ultrastable Lasers, the Ultrafast Lasers, and the Seriously Nonlinear Fiber: A New Alliance for Physics and Metrology*" (IEEE JOURNAL OF QUANTUM ELECTRONICS, VOL. 37, NO. 12, DECEMBER 2001), and also by L. Hollberg, C. W. Oates, E. A. Curtis, E. N. Ivanov, S. A. Diddams, Th.Udem, H. G. Robinson, J. C. Bergquist, R. J. Rafac, W. M. Itano, R. E. Drullinger, and D. J. Wineland, in "Optical frequency standards and measurements" *IEEE J. Quant. Electon.* 37, 1502 (2001).

The limitations for practical application of such laser systems are even more pronounced due the pulse shape distortions when the pulse width is further reduced compounded with the requirement of high power fiber amplification. When the pulse width narrows down to femtosecond level and the peak power increases to over 10 kW, strong nonlinear effects such as self phase modulation (SPM) and XPM will cause more serious spectral and temporal broadening. These nonlinear effects and spectral and temporal broadening further causes a greater degree of distortions to the laser pulses. The technical difficulties cannot be easily resolved even though a large mode area (LMA) fiber can be used to reduce SBS and SRS to increase saturation power. However, the large mode area fiber when implemented will in turn cause a suppression of the peak power and leads to an undesirable results due to the reduction of the efficiency There is an urgent demand to resolve these technical difficulties as the broader applications and usefulness of the short pulse mode-locked are demonstrated for measurement of ultra-fast phenomena, micro machining, and biomedical applications. Different techniques are disclosed in attempt to resolve such difficulties. Such techniques include the applications of nonlinear polarization rotation (NLPR) or stretched mode locked fiber lasers as discussed above. As the NLPR deals with the time domain intensity dependent polarization rotation, the pulse shape distortions cannot be prevented due to the polarization evolution in both the time domain and the spectral domain. For these reasons, the conventional technologies do not provide an effective system configuration and method to provide effective ultra-short pulse high power laser systems for generating high power laser pulses with acceptable pulse shapes.

In addition to the above described difficulties, these laser systems require grating pairs for dispersion control in the laser cavity. Maintenance of alignment in such systems becomes a time consuming task thus prohibiting a system implemented with free space optics and grating pairs from practical applications. Also, the grating pairs further add to the size and weight of the laser devices and hinder the effort to miniaturize the devices implemented with such laser sources.

Therefore, a need still exists in the art of fiber laser design and manufacture to provide a new and improved configuration and method to provide ultra-short high power mode-locked fiber laser with better controllable pulse shapes such that the above discussed difficulty may be resolved. Furthermore, there is a need to amplify the short laser pulse to a higher energy level to broaden the practical usefulness of such laser systems.

SUMMARY OF THE PRESENT INVENTION

It is therefore an aspect of this invention to provide a fiber laser amplifier suitable for amplifying an ultra-short femtosecond laser pulse to a higher energy level up to a milli-Joule (mJ) energy output.

It is another aspect of the present invention to provide a method of using nonlinear polarization evolution (NPE) and dispersion managed fiber cavity to manipulate the pulse propagation in the cavity and balance the self phase modulation (SPM) and dispersion induced pulse broadening/compressing. This method of polarization pulse shaping generates transform-limited pulse shapes through combinational effects of fiber length, the non-linear effects and dispersion such that the above-described difficulties encountered in the prior art can be resolved.

Briefly, in a preferred embodiment, the present invention discloses a fiber laser cavity that includes a fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening-compression in the fiber laser cavity for generating an output laser with a transform-limited pulse shape wherein said laser gain medium further comprising a double cladding Yb-doped Photonics crystal fiber (DCYDPCF) for amplifying and compacting a laser pulse. In a preferred embodiment, the fiber laser cavity further includes a beam splitter functioning as a polarization sensitive isolator for transmitting a portion of a laser pulse to a pair of gratings for transmitting a light projection with an anomalous dispersion for further shaping the output laser. In another preferred embodiment, the fiber laser cavity further includes a Faraday rotating mirror for reversing a polarization of a laser from the pair of gratings. In another preferred embodiment, the fiber laser cavity further includes a polarization sensitive isolator and a polarization controller for further shaping the output laser. In another preferred embodiment, the gain medium further includes the DC YDPCF fiber having a positive dispersion. In another preferred embodiment, the laser cavity is a ring laser cavity. In another preferred embodiment, the gain medium includes the DC YDPCF fiber constituting a positive dispersion fiber segment with a dispersion about −55 ps/nm/km. In another preferred embodiment, the fiber laser cavity further includes an output coupler for transmitting a portion of a laser as the output laser from the fiber laser cavity. In another preferred embodiment, the fiber laser cavity further includes a single mode fiber constituting a fiber segment of a negative dispersion connected to the gain medium. In another preferred embodiment, the output laser includes a laser having a pulse width substantially equal or less than one femtosecond. In another preferred embodiment, the output laser includes a laser having a pulse width substantially equal or less than one femtosecond and having a Gaussian pulse shape. In another preferred embodiment, the output laser includes a laser having a pulse width substantially equal or less than one femtosecond and having a soliton pulse shape. In another preferred embodiment, the output laser includes a laser having a pulse width substantially equal or less than one femtosecond and having a hyperbolic pulse shape. In another preferred embodiment, the gain medium includes the DC YDPCF fiber further having a large mode area (LMA) ranging from 15 micrometers to 80 micrometers. In another preferred embodiment, the gain medium includes a high concentration DC YDPCF fiber having a Yb dopant concentration ranging between 10,000 ppm to 2000,000 ppm.

In a preferred embodiment, this invention further discloses a method for method for generating a pulse-shaped transform-limited output laser from a laser cavity that includes a laser gain medium. The method includes a step of forming the laser cavity by employing a positive dispersion fiber segment and a negative dispersion fiber segment for generating a net negative dispersion. And, the method further includes a step of projecting an input laser from a laser pump into the fiber laser cavity for amplifying and compacting a laser pulse in the gain medium to balance a dispersion induced nonlinearity with a self-phase modulation (SPM) in the fiber laser cavity for generating an output laser with a transform-limited pulse shape. In a preferred embodiment, the method further includes a step of employing a beam splitter as a polarization sensitive isolator for transmitting a portion of a laser pulse to a pair of gratings for transmitting a light projection with an anomalous dispersion for further shaping the output laser. In a preferred embodiment, the method further includes a step of employing a Faraday rotating mirror for reversing a polarization of a laser from the pair of gratings. In a preferred embodiment, the method further includes a step of employing an Ytterbium doped fiber as the gain medium for amplifying and compacting a laser pulse.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 3 functional block diagram for showing a high power amplifier for providing a femtosecond laser pulses.

FIG. 3A is a cross sectional view of a double cladding large mode area Yb doped Photonics crystal fiber implemented in FIG. 3.

FIG. 3B is a cross sectional view of a air core Photonics band gap fiber.

DETAILED DESCRIPTION OF THE INVENTION

Figure 1:
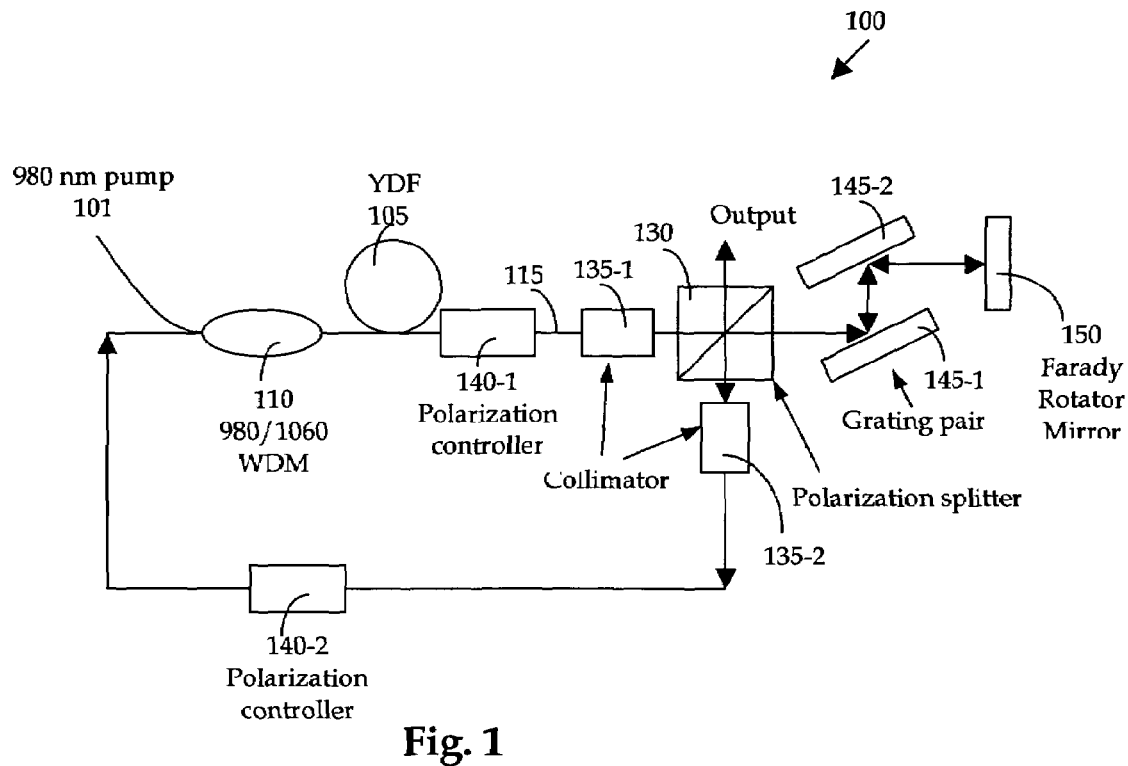
FIG. 1 is functional block diagram for a short-pulse mode-locked fiber laser of this invention.

Referring to FIG. 1 for a schematic diagram of a nonlinear polarization pulse-shaping mode locked fiber laser 100 of this invention. The fiber laser is a ring structure laser that includes a gain medium Ytterbium (Yb) doped fiber (YDF) 105, a fist and a second collimator 135-1 and 135-2 respectively, a first and second polarization controllers 140-1 and 140-2 respectively, a 980/1550 WDM coupler 110, and an output beam splitter 130. The output beam splitter 130 is coupled to a pair of gratings 145-1 and 145-2 coupled to a Faraday rotator mirror 150. A half-meter of YDF 105 is used in the fiber laser as a gain medium and is used to amplify and compress the pulse width. The fiber has a high doping concentration, e.g., 600 dB/m at 976 nm, with a dispersion of −55 ps/nm/km. A 980 nm high power pump laser diode 101 coupled through a wavelength division multiplexer 110 is used to pump the YDF 105 to amplify the pulses circulating in the cavity. The rest of the cavity comprising a single mode (SM) fiber, e.g., a −20 ps/nm/km fiber 115, having a length about three meters and an HI 1060 fiber 120 commercially provided by Corning as standard fiber with dispersion −20 ps/nm/km at 1060 nm having a length of about 0.5 meter. The polarization splitter 130 provides the functions as an isolator is used to couple partial of the light out of the cavity at a given polarization state. The gain medium YDF 105 has a normal dispersion fiber ($\beta''>0$) and remainder portions of the fibers are negative dispersion fibers ($\beta''<0$), the whole cavity average dispersion is designed to operate at anomalous dispersion ($\beta''<0$). This invention implements either the grating pairs or the PBG fibers to achieve the anomalous dispersion for a stable transform-limited pulse. The whole cavity average dispersion is designed to operate at anomalous dispersion ($\beta''<0$).

The fiber laser 100 of this invention is different from the conventional lasers in achieving short pulse mode locked fiber lasers at one micron region as that disclosed by Bagayev S. N., Chebotaiev V. P., *Frequency Stability and Reproducibility of the* 3.39 $^1m$ *He—Ne Laser Stabilized on the Methane Line* (Appl. Phys., 1975, v. 7, p. 71) and by Evenson K. M., Jennings D. A., Peterson F. R. et al. *Laser Frequency Measurements: A Review, Limitations, Extension to* 197 *Thz* (Springer Ser. Opt. Sci., 1977, v. 7, p. 56). Specifically, FIG. 1 discloses a special laser cavity of sigma configuration. The sigma configuration provides the advantages of managing the pulse propagation in the cavity and in the meantime balance the self-phase modulation (SPM) and dispersion to reduce the saturation effects in the amplification region. On the other hand, NPE induced by the nonlinear phase change of SPM will make the polarizations within a single pulse intensity dependent. When the pulse goes through the polarization sensitive splitter, only the highest intensity lined up with the splitter (by adjusting the polarization controllers) will pass and the lower intensity part of the pulse will be filtered and the pulse therefore be shaped. This works as a saturation absorber (SA) and reduce the pulse width. Due to the fact that at one micron region, the fiber works only with positive dispersion, a pair of grating 145-1 and 145-2 is used to achieve negative dispersion and the value can be adjusted by changing the separation distance of the two gratings. A Faraday rotator mirror 150 can be used to reverse the polarization state to make the reflected pulse with the orthogonal state of polarization so it will propagate into the other direction.

With a laser system configured as shown in FIG. 1, with the polarization sensitive beam splitter 130 coupled to the grating pair 145-1 and 145-2, a polarized output laser beam is generated. The coupling ratio of can be adjusted between about 10+/−5% for the mode locked fiber lasers. Furthermore, by taking advantage of the dispersion matching and the nonlinear polarization evolution, the laser system as show is self-started whereby the operation processes are significantly simplified.

The polarization shaping mode locked techniques as disclosed in this invention are different from conventional approach such as Nonlinear Polarization Rotation (NLPR) or stretched mode approach as that disclosed by John L. Hall, et al, L. Hollberg et et al., and S. A. Didamms et al., as discussed above. There are at least three major differences:

1) The conventional NLPR technologies only consider time domain intensity dependent polarization rotation. The present invention applies the polarization evolution of the optical transmissions take into account the variations in both the time domain (intensity dependent) and the spectral domain (wavelength dependent). This is accomplished by selecting a polarizer and quarter wave plate and half wave plate (QWR/HWR). Basically the bandwidth of the retarders is proportional to the index difference $\Delta n$ of the birefringence material, Phase=$N\Delta n/\lambda$, $\lambda$ is the wavelength, N is the order of the retarder or birefringence material such as fiber, In differentiating the equation, it will find out that the bandwidth $\Delta\lambda$ is inversely proportional to the production of $N\Delta n$. This indicates that the laser system of this invention can achieve a larger bandwidth operation by using a low order of retarder, e.g., N=1, and a low birefringence material. Therefore, the retarders are adjusted to let a larger bandwidth pass through the polarizer or a polarization sensitive isolator.

2) The conventional technologies consider only dispersion match, while the pulse shaping functions of this invention takes into account not only the dispersion match but also dispersion slope match to assure the dispersion match is managed over a larger spectral bandwidth. This can be done by using a combination of two or more fiber s with different dispersion and slopes, for example, fiber 1 have different dispersion and dispersion slopes, by combining them together at a proper length ratio, the total dispersion will be able to reach zero at the interested wavelength region over a large range as shown in the FIG. 1A. Therefore, the present invention provides a laser system that is enabled to utilize the gain bandwidth to the maximum and push the pulse width to the minimum accordingly since the bandwidth is inversely proportional to the pulse width.

3) The conventional laser systems are implemented with bulk free space optic in their laser system for either dispersion compensation or polarization control. As that shown in FIG. 1 and will be further described below, this invention is implemented with the all fiber based components and eliminate all free space components. The systems as disclosed in this invention thus provide the ultimate way in making compact and ultra-short pulse laser module for nano-processing system applications.

Figure 2:
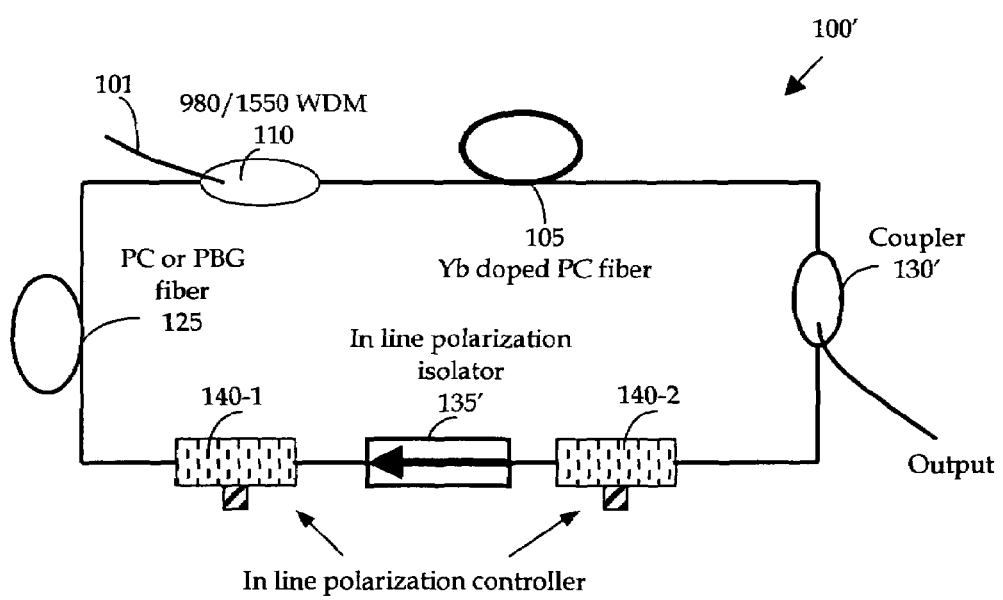
FIG. 2 is functional block diagram for an all fiber short-pulse mode-locked fiber laser of this invention.

FIG. 2 is a schematic diagram of an ultra compact and low cost all-fiber based high power femtosecond fiber laser system of this invention. This is a laser system formed with all fiber-based components. The fiber laser has a ring configuration receiving a laser input through a 980 or 1550 nm WDM 110. The all fiber-based laser 100' similar structure as that shown in FIG. 1 with an Yb doped fiber 105 as a gain medium to amplify and compress the pulse width. A telecom grade 980 nm pump laser is used to pump Yb ions for amplification of the intra cavity pulses. To compensate the dispersion and dispersion slope in the fiber laser cavity, instead of using grating pairs or prisms, another photonic crystal fiber 125 is employed. Because PC fibers 125 can provide both normal and anomalous dispersion at 1060 nm range with its uniquely structured properties and can also manipulate their dispersion slope, a fiber laser cavity can be designed with both dispersion and dispersion slope matched so the pulse can be narrowed to the maximum. In contrast to the prior art technologies, the system as shown in FIG. 2 considers polarization evolution in both time domain (intensity dependent) and spectral domain (wavelength dependent) in achieving ultra-short pulse <50 fs.

The polarization filtering is achieved by managing both dispersion and dispersion slope and further by using fiber-based inline polarizing isolator and polarization controllers. The all fiber-based laser 100' employs an in-line polarization controller 140-1' and 140-2' before and after an in-line polarization sensitive isolator 135' that is implemented with single mode (SM) fiber pigtails. The in-line polarization sensitive control may be a product commercially provided by General Photonics, e.g., one of PolaRite family products. The polarizing isolator 135' has a high extinction ratio and only allows one linear polarization pass through over a wide spectrum. Due to nonlinear effects of SPM, the index of refraction will be dependent on the power intensity so that, in each individual pulse, high intensity peak will experience different intensity-induced birefringence with what low intensity wings will experience. When aligning the peak polarization with the polarizing isolator, only peak portion of the pulse can be transmitted and the wings portion will be blocked. Therefore, the pulse can be mode locked to femtosecond level by combining the polarization shaping and dispersion management.

Figure 3C:
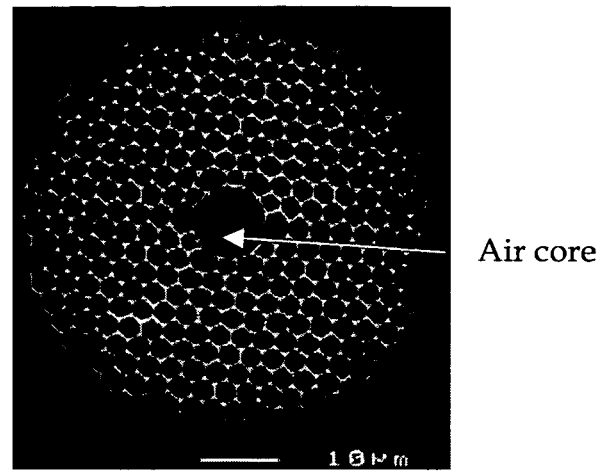
FIG. 3C is diagram for showing an end cap of a piece of coreless fiber or glass attached to the Photonics band gap (PBG) fiber to increase the mode area of output beam at the end facet.
Figure 3C:
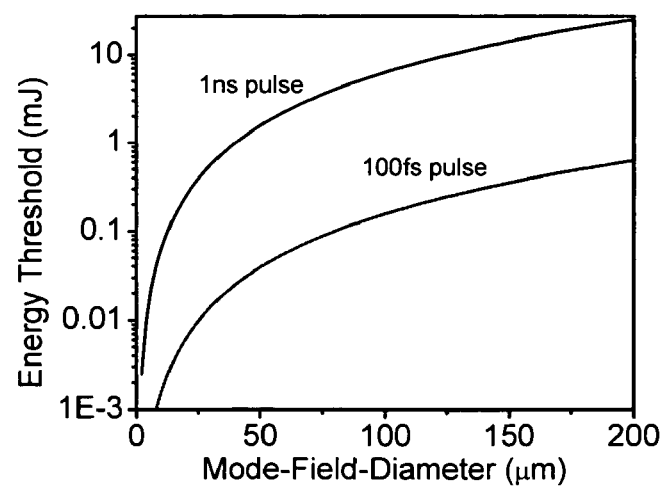

Similar to the laser shown in FIG. 1, the amplification is achieved by using a short piece of high concentration double cladding Yd-doped fiber (DCYDF) with large mode area (LMA) 105 as shown in FIG. 3. The LMA of the DCYDF combined with short length help balance the nonlinear effects such as SPM and XPM with the dispersion so the pulse width will not be broadened after amplification. This DCYDF can be a PC fiber as well in balancing the dispersion and SPM. The laser systems as shown in FIGS. 2 and 3 have the advantages that it is alignment and maintenance free. It is much easier to handle the all-fiber based fiber laser and amplifiers than conventional mode locked solid state and/or fiber lasers. There are no alignment and realignment issues related. After the fibers and components are spliced together and packaged, there will be no need of specially trained technician for operation and maintenance, which reduce the cost and risk significantly in the field applications. Furthermore, it can be easily integrated with other module, such as telescope/focusing system without extra optical alignment effort due to the flexibility of optical fiber. The laser system further takes advantage of the fully spectrum of the gain of the YDF and provides a high quality laser that is suitable for processing the nano-material. The laser system is implemented with all photonic crystal (PC) fibers for both the gain medium and transmission fibers in the cavity to compensate both the dispersions and dispersion slope. The photonic crystal (PC) fiber shows novel properties in manipulating its structures such as hollow lattice shapes and filling factors to obtain both normal and anomalous dispersion below 1300 nm range. The PC fiber is used to compensate both dispersions and slope in the cavity and make short-pulsed fiber laser by selecting various PC fibers. Furthermore, due to one of its unique features of smaller effective area than the regular single mode fibers, stronger nonlinear effects can be caused in the fiber and its impact on SPM can be utilized to achieve shorter cavity by selecting an appropriate PC fiber. On the other hand, by using the feature of air core PC fiber, larger pulse energy can be extracted.

As shown in FIG. 3, a high power amplifier YDF 105 is used to boot the seed pulse inputted from a high power pump 101 through a pump coupling optics 110' to an average power up to 10 W with femtosecond ultra-short pulse amplification. A laser pump 101 that can be a 915 or 980 nm pump laser is used to pump Yb ions for amplification of the ultra-short pulses (ps or fs) through coupling optics 110' or fiber pump combiner (OFS, Somerset, N.J.). This is different from the CW (continuous wave) and nano-second (NS) pulse. Special consideration must be taken into accounts of the effects of SPM, XPM, and FWM. The dispersion has to be carefully selected to make all effects matched and balanced to avoid any pulse broadening and distortion in the non-linear short pulse fiber transmission modes.

Amplification of the pulses can be achieved by using a short piece of high concentration double cladding Yd-doped Photonics crystal fiber (DC YDPCF) 105 with large mode area (LMA) as shown in FIG. 3A. The Photonic crystal fiber (PCF) is designed to have a double cladding feature to couple additional pump power into the fiber thus producing fiber laser with higher average power. It has been demonstrated that an air-cladding region can be created by surrounding the inner cladding with a web of silica bridges that are substantially narrower than the wavelength of the guided radiation. FIG. 3A shows a typical design of double cladding PCF. With this design, a significantly increased numerical aperture (NA) as high as 0.8 can be reached compared to conventional DC LMA fibers. The shrinking of the inner cladding means that overlap ratio of the active core to the inner cladding increases. This allows use shorter length of fiber to achieve high power amplification.

The large mode area (LMA) of the DCYDPCF combined with short length help balance the nonlinear effects such as SPM and XPM with the dispersion so the pulse width will not be broadened after amplification. This DC YDPCF can be a regular DC fiber as well in balancing the dispersion and SPM. Extra chirp of the pulses can be further dechirped by a piece of air core Photonics band gap (PBG) fiber as that shown in FIG. 3B, which can provide large anomalous dispersion (120 ps/nm/km, for example, from Crystal Fiber, Denmark. Part #HC-1060-02). The PBG fiber has an anomalous dispersion, which is opposite to regular fiber at 1 um. It can be used to compensate (dechirp) the pulse. By manipulating the number of air holes and structures, various dispersions can be achieved. To further improve the surface damage, end cap of a piece of coreless fiber or glass can be attached to the PBG fiber to increase the mode area of output beam at the end facet. This will make possible to amplify ps to 100 fs pulse to the level of mJ as that shown in FIG. 3C.

To further improve the performance of dispersion control, a special fiber is implemented by manipulating the filling factor of the air holes as that disclosed by V. Reichel, et al., in "Applications of pump multiplexed Yb-doped fiber lasers," SPIE 4974, 148 (2003). The structure was made by stacking silica capillaries into a hexagonal close packed structure and replacing a capillary at the center of the stack with a solid silica rod to form a solid fiber core. The air core will be formed in a similar way thus form a fiber generally known as photonic band gap-PBG fiber. FIGS. 6A and 6B show the SEM picture of a PCF and the dispersion and slope change vs. the hole sizes. It clearly shows that optimizing the photonic crystal fiber (PCF) structure; the dispersion can be flat over a spectral range over 200 nm. There is no possibility for the conventional fibers to achieve such performance.

With a laser system as shown in FIG. 2, a high output power over ten watts is achieved. Furthermore, the pump power conversion efficiency is as high as 85% with minimum nonlinear effect by using commercially available DCYDPCF. The beam output of the fiber laser has an excellent output beam quality with a nature of single mode diffraction limited quality with $M^2=1$. The gain fibers can be coiled in small dimension and packaged with other components in a compact size. The standard product of 15 W fiber lasers as that configured according to FIG. 2, all the components are packaged into a containing house with approximately dimensions of 130 mm×70 mm×35 mm. A laser system of compact size is therefore provided that can be conveniently customized.

Figure 4A:
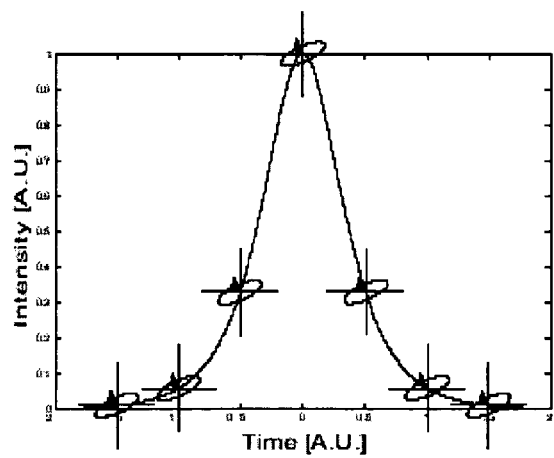
FIGS. 4A and 4B are waveforms for showing polarization changes as laser pulse transmitted over a laser cavity.
Figure 4B:
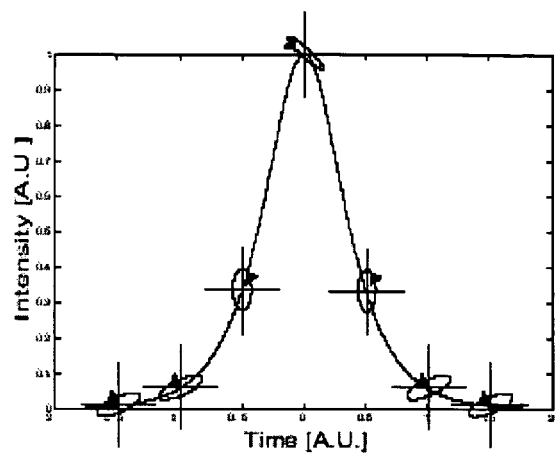

A fiber exhibits a nonlinear birefringence that depends on the local intensities of the two orthogonally polarized field components. As a result, an elliptically polarized pulse will have two orthogonal components, i.e., x and y components. These two components experience different phase shifts, thus rotating the polarization ellipse. Since the phase shift is an intensity-dependent process, it rotates the polarization of a pulse at different amounts depending on the pulse's local intensity. FIGS. 4A and 4B show polarization's physical effect on a pulse. If the nonlinear effects are ignored and let FIG. 4A represent a uniformly polarized pulse launches into an isotropic optical fiber, a uniformly polarized output pulse is obtained as that depicted by FIG. 4B. Therefore, by launching the same pulse into the same fiber implemented with the effects of self phase modulation (SPM) and Cross phase modulation (XPM), an output similar to FIG. 4B can be generated. Examining FIG. 4B, it is noted that the low intensity wings are not affected, yet, as the pulse's intensity increases, a rotation of the polarization ellipse is observed. Therefore, a nonlinear phase evolution (NPE) induced by the nonlinear phase change of self-phase modulation (SPM) causes a polarization rotation, as the polarization is now pulse intensity dependent. Thus, the mode lock mechanism is caused by the SPM induced NPE. When the pulse passes through the polarization sensitive isolator that is controlled and adjusted by a polarization controller, only the highest intensity that lined up with the isolator will pass. The lower intensity part of the pulse is filtered out. Therefore, the pulse is well shaped and thus works as a saturation absorber (SA) to reduce the pulse width. The polarization controller 140 can be fiber based, or bulk optical quarter/half wave retarders, or a combination of both. The "polarization sensitive isolator and polarization controllers" works to select a polarization for the pulses, which have different polarization states in time domain.

Figure 5:
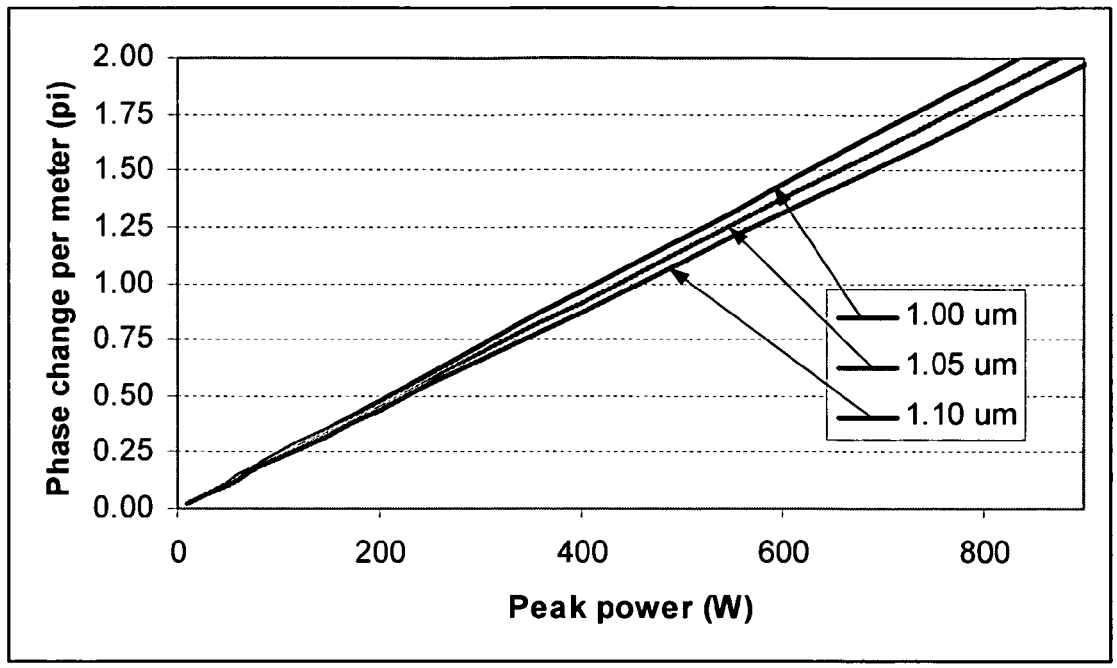
FIG. 5 is a diagram for showing an analysis result of phase change as a function of optical power.

When the pulse circulates in the fiber laser cavity, the laser pulse experiences the self-phase modulation (SPM) induced pulse broadening effects in both negative anomalous single mode fibers and positive normal dispersion fiber regions due to a high peak power and short pulse width (<ps). Moreover, in the region of positive dispersion, i.e., $\beta''>0$, in the YDF 105, because the peak power is very high (>200 W for a 200 fs pulse), the nonlinear length and the dispersion length are comparable, i.e., ~1 m, in the YDF 105 segment. The pulse can be compressed by using the effects of both self phase modulation (SPM) and dispersion. An analysis is carried out to quantify the nonlinearity effects of the (SPM) phase change on a fiber with a mode field diameter of 10 micron. FIG. 5 shows the results of the analyses. According to FIG. 5, the phase (corresponding to the state of polarization) of the light is significantly dependent on the intensity of the light and the wavelength. At a given wavelength, 3 dB power change can generate 50% of the phase change. At a given power level, 10% wavelength change can generate same amount of phase change.

Since the gain of an Yb-doped fiber can cover over 100 nm from 1000 nm to 1100 nm, this gain medium enables the generation of a very short pulse less than 50 fs. However, because the polarization state is a function of wavelength (in proportional to $\Delta\lambda/\lambda$, in Yb fiber laser, it will be 10%), in spectral domain, different wavelength will experience different states of polarization. This will in turn affect the pulse width and quality. Moreover, even the dispersion management can be done in certain bandwidth, it can not cover the whole 100 nm bandwidth of the gain medium by using conventional fibers. For the purpose of generating ultra-short laser pulses, the dispersion slope compensation has to be taken into account. In conclusion, in order to take advantage of the maximum gain spectrum of the YDF, dispersion slope compensation is definitely required in combination with polarization compensation in spectral domain. A simulation analysis on a fiber with a mode field diameter of ten micrometers is performed to quantify the nonlinearity effects on the (SPM) phase change. FIG. 5 shows the simulation results with the phase of the light corresponding to the state of polarization that has a strong functional relationship and depends significantly on the intensity of the light and the wavelength. At a given wavelength, 3 dB power change can generate 50% of the phase change. At a given power level, a change of 10% in wavelength can generate same amount of phase change.

Figure 6:
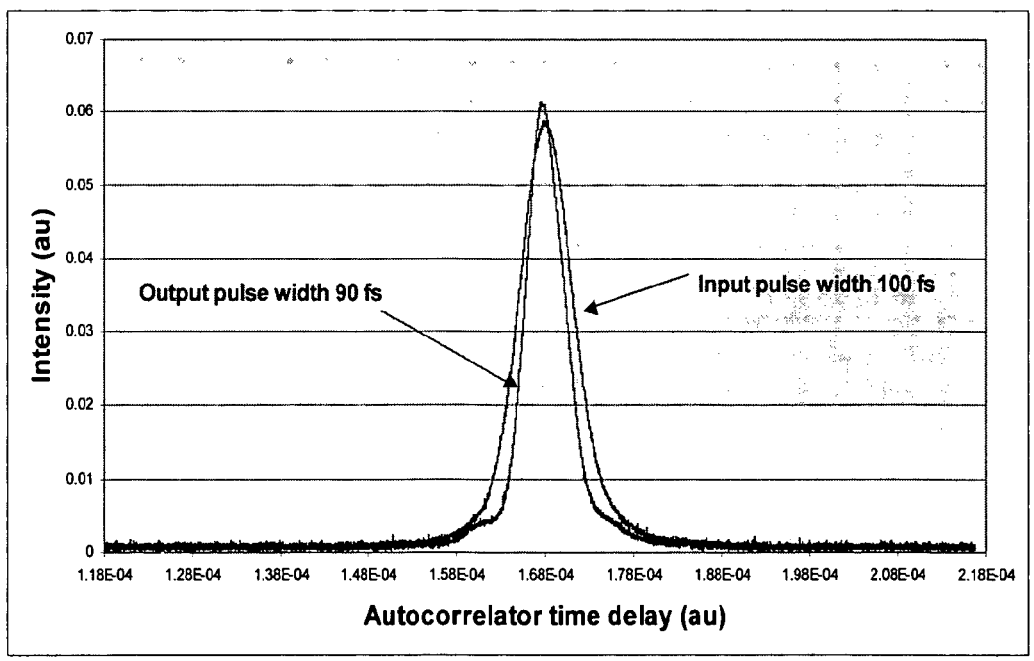
FIG. 6 shows the waveforms of high power ultra-short pulse amplification without significant distortions.

By using a high concentration doped fiber with appropriate dispersion, the systems as shown in FIGS. 1 and 2 are able amplify 1 mW 100 fs pulses into 100 mW with less pulse broadening effect. FIG. 6 shows the pulse traces taken from autocorrelator for before and after amplification. It indicates that there is little distortion or broadening effects. To further amplify the power up to 1 W, a double cladding high concentration doped fiber may be implemented with a properly selected dispersion, since fiber allows more pump power launching into the fiber.

Figure 7:
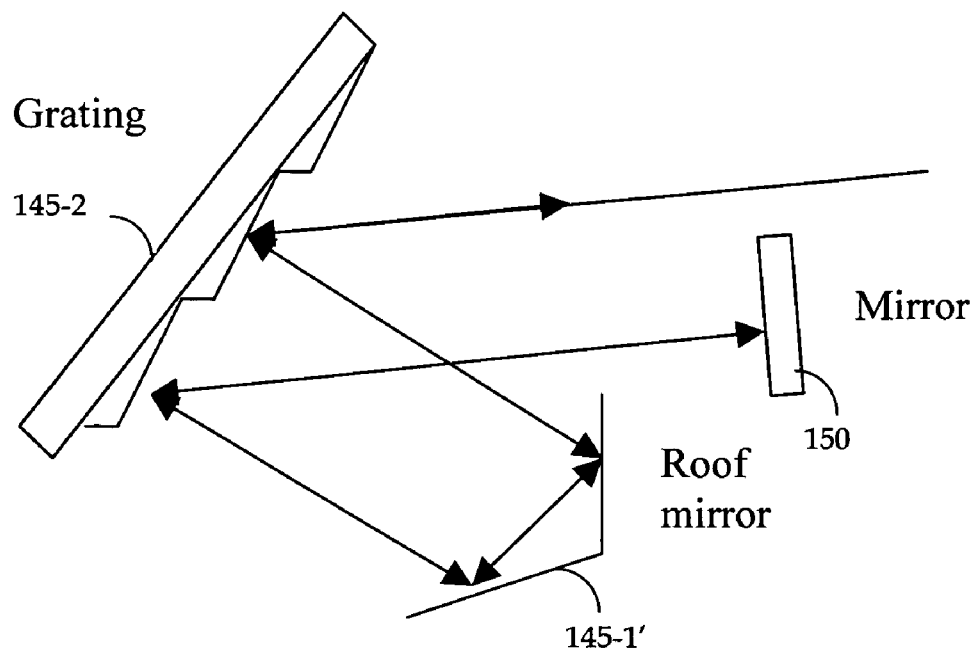
FIG. 7 shows a grating structure of this invention and FIG. 7A Shows a paired gratings.
Figure 7A:
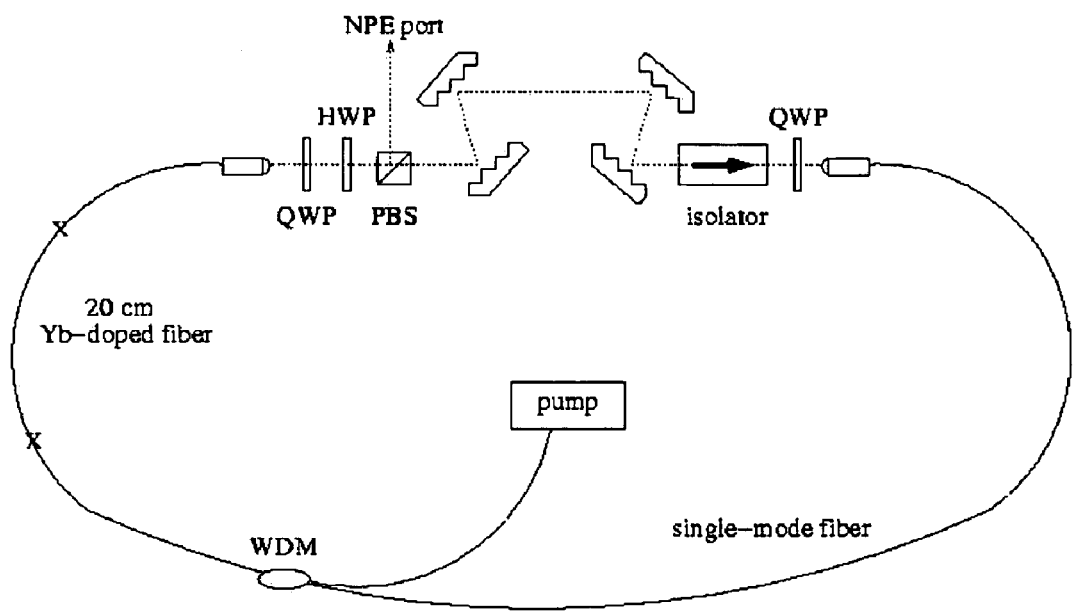

FIG. 7 shows another preferred embodiment of this invention. Instead of using a grating pairs as that shown in FIG. 7A, a roof mirror 145-1' is used to replace the pair configuration of the gratings implemented in the conventional laser systems. The roof mirror is used to displace and reflect light back onto the grating so the pulse stretching and compression can be achieved with one grating.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A fiber-based short-pulse laser, comprising:
    an input coupler configured to couple pump light into a fiber laser cavity;
    a fiber-based gain medium having a positive dispersion and configured to amplify and compress a signal laser pulse in response to the pump light, wherein the signal laser pulse has a peak portion having a peak polarization and a wing portion having a wing polarization different from the peak polarization;
    a dispersion-compensation device having a negative dispersion to compensate the positive dispersion of the laser medium, wherein the fiber-based gain medium and the dispersion-compensation device have a net negative dispersion; and
    a polarization isolator configured to block the wing portion of the signal laser pulse and uni-directionally pass the peak portion of the signal laser pulse, wherein the input coupler, the fiber-based gain medium, the dispersion-compensation device, and the polarization isolator in part define the fiber laser cavity, wherein the fiber laser cavity outputs an output laser pulse formed by the peak portion of the signal laser pulse.

2. The fiber-based short-pulse laser of claim 1, wherein the polarization isolator is configured to pass a light beam having a linear polarization aligned in a first polarization direction.

3. The fiber-based short-pulse laser of claim 2, further comprising:

a first fiber-based polarization controller configured to align the peak polarization of the signal laser pulse along the first polarization direction before the signal laser pulse is received by the polarization isolator; and a second fiber-based polarization controller configured to control the peak polarization of the peak portion of the signal laser pulse and to pass the peak portion of the signal laser pulse in the fiber laser cavity.

4. The fiber-based short-pulse laser of claim 1, wherein the polarization isolator is fabricated with a single-model optical fiber.

5. The fiber-based short-pulse laser of claim 1, wherein the polarization isolator is a beam splitter.

6. The fiber-based short-pulse laser of claim 3, wherein beam splitter is configured to output at least a portion of the peak portion of the signal laser pulse outside of the fiber laser cavity.

7. The fiber-based short-pulse laser of claim 1, wherein the dispersion-compensation device comprises a pair of gratings configured to diffract the signal laser pulse.

8. The fiber-based short-pulse laser of claim 1, wherein the dispersion-compensation device comprises:

a single grating configured to diffract the signal laser pulse to produce a diffracted signal laser pulse; and a roof mirror configured to reflect the diffracted signal laser pulse back to the single grating, wherein the diffracted signal laser pulse is diffracted again.

9. The fiber-based short-pulse laser of claim 1, wherein the dispersion-compensation device comprises a single-mode fiber having a negative dispersion.

10. The fiber-based short-pulse laser of claim 1, further comprising an output coupler configured to output at least a portion of the peak portion of the signal laser pulse outside of the fiber laser cavity.

11. The fiber-based short-pulse laser of claim 1, wherein the output laser pulse has a pulse width equal or less than one femtosecond.

12. The fiber-based short-pulse laser of claim 11, wherein the output laser pulse has a Gaussian pulse shape, a soliton pulse shape, or a hyperbolic pulse shape.

13. The fiber-based short-pulse laser of claim 1, wherein the fiber-based gain medium comprises a double cladding Ytterbium-doped Photonics crystal fiber (DC YDPCF).

14. The fiber-based short-pulse laser of claim 13, wherein the double cladding Ytterbium-doped Photonics crystal fiber has a dispersion between −45 ps/nm/km and −65 ps/nm/km.

15. The fiber-based short-pulse laser of claim 13, wherein the DC YDPCF has a large mode area (LMA) ranging from 15 micrometers to 80 micrometers.

16. The fiber-based short-pulse laser of claim 13, wherein the DC YDPCF has a single mode large-mode area (LMA) structure surrounded by an array of air gaps or an air core.

17. The fiber-based short-pulse laser of claim 13, wherein the DC YDPCF has a Yb dopant concentration ranging from 10,000 ppm to 2000,000 ppm.

18. The fiber-based short-pulse laser of claim 1, wherein the input coupler, the fiber-based gain medium, the dispersion-compensation device, and the polarization isolator in part form a ring-shaped fiber laser cavity.

19. A fiber-based short-pulse laser, comprising:

an input coupler configured to couple pump light into a fiber laser cavity;

a fiber-based gain medium having a positive dispersion and configured to amplify and compress a signal laser pulse in response to the pump light, wherein the signal laser pulse has a peak portion having a peak polarization and a wing portion having a wing polarization different from the peak polarization;

a dispersion-compensation device having a negative dispersion to compensate the positive dispersion of the laser medium, wherein the fiber-based gain medium and the dispersion-compensation device have a net negative dispersion; and a first fiber-based polarization controller configured to align the peak polarization of the signal laser pulse along a first polarization direction;

a polarization isolator configured to uni-directionally pass the peak portion of the signal laser pulse having its peak polarization aligned along the first polarization direction, wherein the polarization isolator is configured to block the wing portion of the signal laser pulse; and a second fiber-based polarization controller configured to control the peak polarization of the peak portion of the signal laser pulse, wherein the polarization isolator is positioned between the first fiber-based polarization controller and the second fiber-based polarization controller, wherein the input coupler, the fiber-based gain medium, the dispersion-compensation device, and the polarization isolator in part define the fiber laser cavity, wherein the fiber laser cavity outputs an output laser pulse formed by the peak portion of the signal laser pulse, wherein the output laser pulse has a pulse width equal or less than one femtosecond.

20. The fiber-based short-pulse laser of claim 19, wherein the polarization isolator is fabricated with a single-model optical fiber.

21. The fiber-based short-pulse laser of claim 19, wherein the polarization isolator is a beam splitter.

22. The fiber-based short-pulse laser of claim 21, wherein beam splitter is configured to output at least a portion of the peak portion of the signal laser pulse outside of the fiber laser cavity.

23. The fiber-based short-pulse laser of claim 19, wherein the dispersion-compensation device comprises a pair of gratings configured to diffract the signal laser pulse.

24. The fiber-based short-pulse laser of claim 19, wherein the dispersion-compensation device comprises a single-mode fiber having a negative dispersion.

25. The fiber-based short-pulse laser of claim 19, further comprising an output coupler configured to output the peak portion of the signal laser pulse outside of the fiber laser cavity.

26. The fiber-based short-pulse laser of claim 19, wherein the fiber-based gain medium comprises a double cladding Ytterbium-doped Photonics crystal fiber (DC YDPCF).

27. The fiber-based short-pulse laser of claim 26, wherein the double cladding Ytterbium-doped Photonics crystal fiber has a dispersion between −45 ps/nm/km and −65 ps/nm/km.

28. The fiber-based short-pulse laser of claim 19, wherein the input coupler, the fiber-based gain medium, the dispersion-compensation device, and the polarization isolator in part form a ring-shaped fiber laser cavity.

29. A fiber-based short-pulse laser, comprising:

an input coupler configured to couple pump light into a fiber laser cavity;

a fiber-based gain medium having a positive dispersion and configured to amplify and compress a signal laser pulse in response to the pump light, wherein the signal laser pulse has a peak portion having a peak polarization and a wing portion having a wing polarization different from the peak polarization;

a dispersion-compensation device having a negative dispersion to compensate the positive dispersion of the laser medium, wherein the fiber-based gain medium and the dispersion-compensation device have a net negative dispersion; and a first fiber-based polarization controller configured to align the peak polarization of the signal laser pulse along a first polarization direction;

a polarization isolator configured to uni-directionally pass the peak portion of the signal laser pulse having its peak polarization aligned along the first polarization direction, wherein the polarization isolator is configured to block the wing portion of the signal laser pulse;

a second fiber-based polarization controller configured to control the peak polarization of the peak portion of the signal laser pulse, wherein the polarization isolator is positioned between the first fiber-based polarization controller and the second fiber-based polarization controller, wherein the input coupler, the fiber-based gain medium, the dispersion-compensation device, and the polarization isolator in part define a ring-shaped fiber laser cavity; and an output coupler in the fiber laser cavity, wherein the output coupler is configured to output an output laser pulse having a pulse width equal or less than one femtoseconds, wherein the output laser pulse is formed by the peak portion of the signal laser pulse.

* * * * *